Patented May 4, 1943

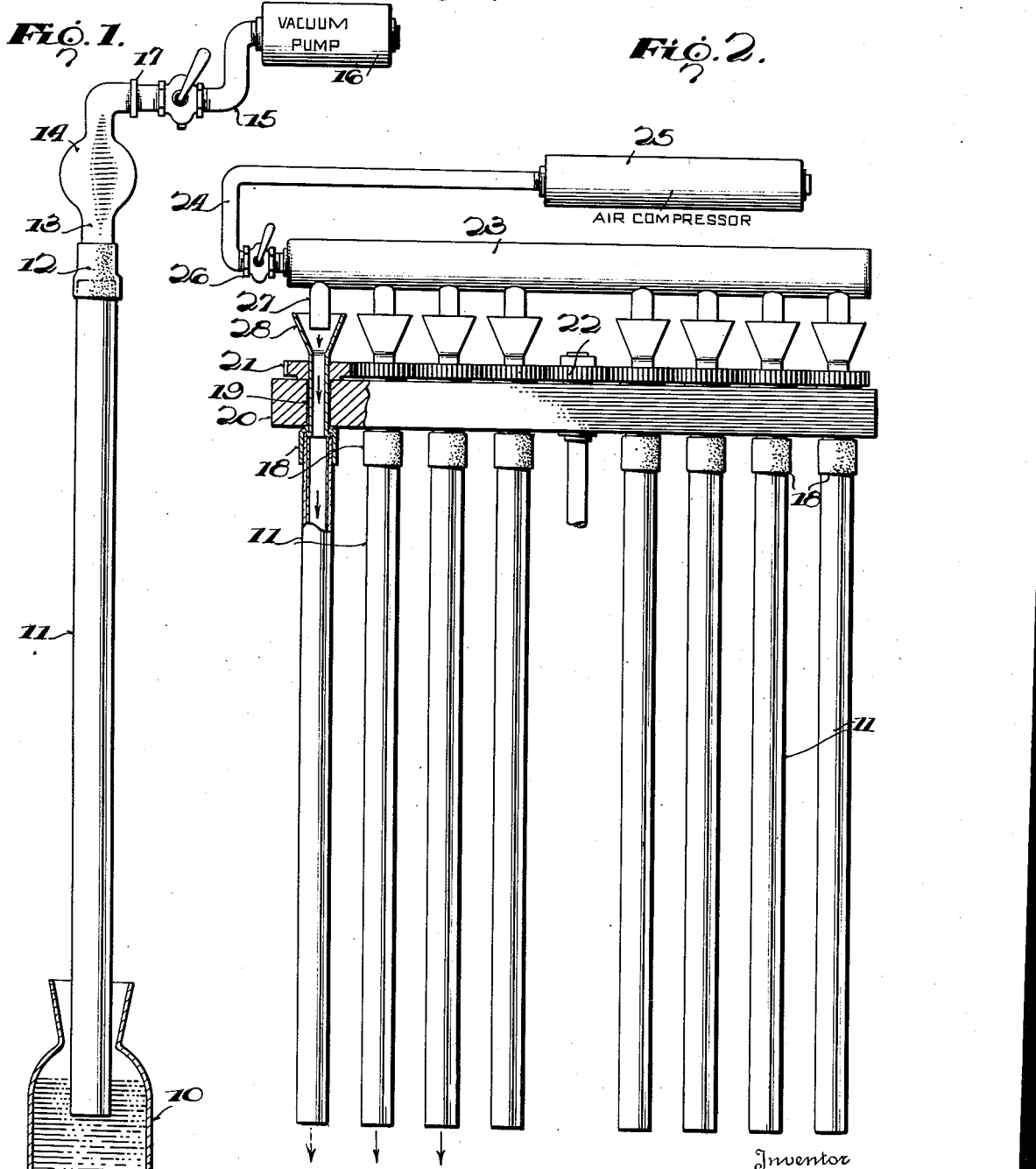

2,318,060

UNITED STATES PATENT OFFICE 2,318,060

METHOD OF APPLYING LUMINESCENT MATERIAL

Thomas M. Cortese, East Orange, N. J.

Application August 12, 1939, Serial No. 289,928

3 Claims. (Cl. 117—97)

My invention relates to a method of applying powdered fluorescent or luminescent material to the containers of electric lamp devices.

An important object of the invention is to provide a method which will effect a marked saving in time in the production of the desired product, while producing a superior product.

A further object of the invention is to provide a method of the above mentioned character which will provide a coating of fluorescent or luminescent material for a bulb or tube, which coating will be more securely bonded to its surface, and will not readily flake off when subjected to light jarring or tapping and will not blow off when subjected to sudden air currents.

A further object of the invention is to provide a method wherein a low viscosity liquid coating composition is used, so that the excess coating composition may instantly or substantially instantly drain from the surface being treated.

A further object of the invention is to provide for the acceleration of the drying of the low viscosity liquid coating composition, so that the same sets in whole or in part, sufficiently rapidly to provide a uniform coated surface.

A further object of the invention is to materially reduce the time necessary to bake the dried coated surface when applied to the article.

A further object of the invention is to materially reduce the time required for the application of the liquid coating composition to the surface and the drying of the same.

Other objects and advantages of the invention will be apparent during the course of the following description.

The present application is a continuation in part of my application for Fluorescent or luminescent lamp composition, filed December 3, 1938, Serial No. 243,860, and which has matured into Patent 2,172,046.

In the accompanying drawing forming a part of this application and in which like numerals are employed to designate like parts throughout the same, Figure 1 is a side elevation of apparatus used in the practice of my method, and, Figure 2 is a similar view of the drying apparatus.

For the practice of my method, I provide a low viscosity binder for the powdered fluorescent or luminescent material. In producing this binder, I employ Celluloid as one of the ingredients. The Celluloid which I employ contains nitrocellulose having a low viscosity of 50 to 100 seconds, and camphor present in about 25 parts by weight and nitro-cellulose present in 75 parts by weight. The camphor serves as a plasticizer and also as a stabilizer. The camphor serves to retard or prevent the discoloration of the coating of the tube, during operation. The low viscosity nitro-cellulose present in the Celluloid is important, as it imparts a low viscosity to the resultant binder. I could not use a high viscosity nitro-cellulose having 1000 seconds viscosity, as the resultant binder would have entirely too high a viscosity, for the practice of my method.

The Celluloid thus described is dissolved in a solvent, such as butyl aceate, amyl acetate, ether, alcohol, acetone, or other solvent. As a preferred example of producing the binder, I add 2 grams of Celluloid heretofore described to 100 cc. of amyl acetate, thus producing a liquid solution, having a low viscosity. This low viscosity binder has a viscosity of 24 seconds or 23.8 centipoises. This is the viscosity of the binder at 72° F.

To this binder I preferably add from one to five drops of a 10% aqueous solution of sodium or potassium silicate or a mixture of them. Proportionate amounts of weaker or stronger solutions of sodium or potassium silicate may also be used, the amounts being so proportioned as to give the same amount of sodium or potassium silicate as is contained in from one to five drops of a 10% aqueous solution. From .1 to .7 gm. of powdered boric oxide may also be added to the binder, by grinding the boric oxide in the binder in a mortar. These added inorganic substances cause better adhesion in the final product. These added inorganic substances do not perceptibly alter the viscosity of the binder. The binder with or without the added inorganic substances is a transparent liquid, with the boric oxide in suspension, if boric oxide is added. The binder has the low viscosity of 24 seconds as indicated. The inorganic substances may be omitted, if desired, and the method may be practiced with satisfactory results.

To 100 cc. of this completed liquid binder, having the low viscosity 24 seconds, I then add 50 gm. of a powdered fluorescent or luminescent material and the mixture is stirred to produce a homogeneous mass. As illustrations of fluorescent materials, I use calcium tungstate, zinc sulphide, zinc silicate, zinc-cadmium sulphide. These materials may also be considered as luminescent materials. The resultant liquid coating composition is a liquid mass wherein fluorescent or luminescent powdered material is in suspension within the liquid binder, and the resultant coating liquid composition has a low viscosity. At 72° F., this low viscosity is 29.35 seconds or 28.26 centipoises. The viscosity of the liquid coating composition is so low that the coating will flow freely and may be readily sucked up into a tube, and the excess coating will drain instantaneously or substantially instantaneously, as will be more fully described.

The relative amount of the fluorescent or luminescent powder added to the binder may be varied and it may be increased, but the addition of a further amount of the powder will increase the viscosity of the mass and would also produce a heavier coating.

The liquid coating composition produced by 100 cc. of the liquid binder and the 50 grams of powdered fluorescent or luminescent material, is the preferred composition, as it will produce a thin coating which is applied in a highly uniform manner over the entire surface. While the viscosity of the coating composition may be increased, by the addition of a further amount of the fluorescent or luminescent powder, yet the viscosity should not be increased to such an extent as the advantages of the present method cannot be obtained, but of course variations may be made in the viscosity.

In the use of my liquid coating composition, in the practice of the method, the liquid coating composition is held within a container or bottle 10. The tube 11 in the present instance, to have its inner surface coated, is vertically arranged and is suspended at its upper end by insertion within a rubber nipple or coupling 12, connected with a pipe 13, having a trap 14 connected therein. The pipe 13 and trap 14 are preferably formed of transparent glass, and as a unitary structure. A rubber hose 15 or the like is connected with the upper end of the pipe 13 and leads to a source of vacuum 16, such as a vacuum tank or vacuum pump. Connected in the hose 15 is a valve 17, which is a two-way valve, to alternately place the pipe 13 in communication with the source of vacuum 16 and then break this communication and place the pipe 13 in communication with the atmosphere. When the glass tube 11 is thus inserted into the nipple 12, the container 10 is elevated about the lower end of the tube 11 so that this lower end is emersed in the liquid coating composition. The valve 17 is then manipulated to create a suitable suction within the tube 11 and the liquid coating composition is drawn up into the tube 11 throughout its entire length. Should any of the liquid coating composition pass the tube 11, it will be caught in the trap 14. After the liquid coating composition has passed upwardly throughout the entire length of the tube, the valve 17 is manipulated to cut off the suction and to place the interior of the tube 11 in communication with the atmosphere. As soon as this occurs, the excess liquid coating composition will instantly or substantially instantly drain from the inner surface of the tube 11 and be collected within the container 10, leaving a normal thin uniform coating upon the tube. The tube 11 is now removed from connection with the nipple 12 and its upper end is immediately inserted into a nipple 18, and the entire tube is supported from its upper end, its lower end being spaced from the base. There are any suitable number of nipples 18, which are connected with tubular vertical rotatable shafts 19 mounted upon a horizontal support 20. These tubular shafts are provided with gears 21 in permanent mesh, and the inner gears 21 engage a master gear 22, which drives them. The tube 11 is therefore vertically supported at its top and is rotated upon its longitudinal axis. This rotation of the tube upon its longitudinal axis occurs immediately after the draining of the excess liquid coating composition, as explained, and immediately after the draining of the excess liquid coating composition and during the rotation of the tube, the drying of the normal liquid coating composition applied to the inner surface of the tube is accelerated. This acceleration of the drying during the rotation of the tube is effected by a regulated amount of dry air, which is blown through the tube, from its upper end to its lower end. To accomplish this, a casing or chamber 23 is arranged near and above the upper ends of the tubular shafts 19 and this chamber is connected with a pipe 24 in turn connected with the outlet end of an air compressor 25. A control valve 26 is connected in the pipe 24 to completely or partly close the pipe 24, as desired, to regulate the flow of air or to completely cut the same off. Leading into the chamber 23 are nozzles 27, arranged near and above flaring ends 28 of the tubular shafts 19. The compressed air therefore enters the upper ends of the tubular shafts and is conducted thereby into the upper end of the tube 11 and discharges from the lower end of the tube. The air thus employed is dry and the purpose of using the dry air is to accelerate the drying of the liquid coating composition applied to the inner surface of the tube, as stated. The air may be employed at atmospheric temperature or it may be slightly heated, such as from 90° F. to 150° F. In the practice of my method, the tubes being coated internally may be four feet long although this length may be varied. After the low viscosity liquid coating composition is sucked up into the tube to coat the inner surface thereof, the vacuum is broken and the interior of the tube is placed in communication with the atmosphere whereby practically all of the excess low viscosity liquid coating composition will instantly or substantially instantly drain from within the tube, as explained. This produces a thin uniform normal coating which will not tend to run or drain further, to any perceptible extent, before and after the drying of the same is accelerated. The drying of this coating is immediately accelerated, after the draining of the excess coating, by the circulation of air through the tube, as explained, with the result that the coating will start to dry or set immediately so that the coating will not slide or creep down in the tube nor will the fluorescent or luminescent powdered material separate out from the liquid binder. If the drying of the coating was not accelerated, there would be some tendency for the normal coating to run or slide down the tube, although the excess coating had previously drained out. I have found that my coating will dry from within five to twenty-five minutes depending somewhat upon the diameter of the tubes and the solvent used. The time for drying in accordance with my method is reduced in a marked degree, first by the fact that the draining of the excess liquid coating composition occurs instantly or substantially instantly when the vacuum is broken, whereby the accelerating drying period may be started quickly. Further, the normal coating produced upon the interior of the tube is thin and uniform and will require less time to dry the same.

After the drying step, the tube or tubes are removed from the drying machine and may be arranged horizontally upon trays in a baking oven and are there subjected to a heat treatment of from 400° C. to 1000° C., depending upon the thickness of the coating produced by the liquid coating composition, the thickness of the wall of the tube or bulb, the hardness or softness of the glass constituting the bulb. The heat treatment will be such as to obtain a proper adhesion between the fluorescent or luminescent particles of the coating and the wall of the container or tube which is believed to be due to the fusion, to a certain extent, between the glass and particles.

Since my method produces a thin uniform coating, the time necessary to effect the baking is materially reduced. The tubes or bulbs coated with my fluorescent or luminescent material or composition may have their inner or outer surfaces thus treated and the tubes or bulbs may be clear or colored glass. I contemplate treating in a similar manner other articles or containers relating to gaseous electric discharge devices including mercury vapor tubes and tubes or devices having a gaseous atmospheric condition. One of the lamp devices to which my coating may be applied is illustrated in the patent to J. L. Cox 2,093,693. The tubes, bulbs or devices, coated with the fluorescent or luminescent material are adapted to be used in interior lighting, decorating, advertising, and other applicable purposes that might disclose themselves from time to time.

While the tubes are being baked, as explained, the constituents of the liquid binder are driven off or oxidized, and the powdered fluorescent or luminescent material will adhere to the wall of the tube or bulb. The presence of the small amount of inorganic substance, aids in the proper adhesion of the fluorescent or luminescent material to the tube or bulb. The tube or bulb will be found to be coated or covered by a thin layer of the fluorescent or luminescent material, when 50 grams of the powdered material is added to 100 cc. of the binder. This coating will be uniform throughout and will not be porous as viewed with the naked eye. This coated surface will provide a uniform light transmitting surface or coat. When it is desired to provide a thick coat, the relative amount of the powdered fluorescent or luminescent material is increased with respect to the fixed amount of the binder.

It is preferred to use the camphor, as a plasticizer and stabilizer, with the low viscosity nitrocellulose, for the presence of the camphor causes better adhesion, more flexibility, and tends to prevent discoloration in operation. However, I contemplate using other plasticizers with the low viscosity nitro-cellulose, and I may use butyl phthalate, as a plasticizer. When this is done, about two or three drops of the butyl phthalate has been found sufficient to add to about 100 cc. of the nitro-cellulose of low viscosity.

I prefer to add the aforementioned amounts of the inorganic substances such as sodium silicate, as this substance causes a better adhesion of the fluorescent or luminescent powders with the glass, during the heating or baking operation, in obtaining the final product. However, satisfactory results can be obtained by omitting these inorganic substances. The low viscosity, for the nitro-cellulose, for the binder, and for the final liquid coating composition, given in seconds, is the time required, in the given liquid, for a standard steel ball to drop ten inches.

While I contemplate producing the final product by baking, yet the coated container may be used with some degree of success without baking the dried coating, and I therefore contemplate omitting the baking step. Further, the product as such may be made without baking, and the baking may be subsequently effected, if desired.

It is to be understood that the form of my invention herewith shown and described is to be taken as a preferred example of the same and that various changes may be made in the steps of the method, and that known chemical equivalents may be employed, and that changes may be resorted to in the proportions of the ingredients, without departing from the spirit of my invention or the scope of the subjoined claims.

Having thus described by invention, what I claim is:

1. The method of applying a coating of powdered luminescent material to the inner surface of a glass tube having both ends open, comprising arranging the tube in a vertical position, flowing upwardly into said tube from the lower end thereof a low viscosity coating solution containing a finely divided luminescent material in suspension, rapidly draining by gravity the excess coating solution from the tube while the tube is in a vertical position to thereby form a thin coating of the solution upon the inner surface of the tube, rotating the tube upon its longitudinal axis while vertical, and immediately subjecting the thin coating while the tube is being rotated about its vertical axis and before the thin coating has had time to flow down the vertical tube to any substantial extent to a drying action to accelerate the setting of the thin coating and thereby retard the tendency of the thin coating to flow down the vertical tube.

2. The method of applying a single-layer coating of powdered luminescent material to the inner surface of a glass tube having both ends completely open, comprising arranging the tube in a vertical position and emersing the lower end of the tube into a low viscosity coating solution containing a finely divided luminescent material in suspension while maintaining the bore of the tube at its lower end unobstructed, applying suction to the upper end of the vertical tube to cause the low viscosity coating solution to flow upwardly into the tube from the lower end thereof, breaking the suction and rapidly withdrawing by gravity the excess coating solution from the tube while the tube is in the vertical position to thereby form a thin uniform single-layer coating of the solution upon the inner surface of the tube, and immediately subjecting the thin unset single-layer coating while the tube is in a vertical position and before the thin coating has had time to flow down the vertical tube to any considerable extent to the drying action of air forced downwardly through the upper end of the tube to accelerate the setting of the thin coating and thereby retard the tendency of the thin single-layer coating to flow down the vertical tube.

3. The method of applying a single layer coating of powdered luminescent material to the inner surface of a glass tube having both ends open, comprising arranging the tube in a vertical position and emersing the lower end of the tube into a low viscosity coating solution containing a finely divided luminescent material in suspension while maintaining the bore of the tube at its lower end unobstructed, applying suction to the upper end of the vertical tube to cause the low viscosity coating solution to flow upwardly into the tube from the lower end thereof, breaking the suction and rapidly withdrawing by gravity the excess coating solution from the tube while the tube is in the vertical position to thereby form a thin uniform single layer coating of the solution upon the inner face of the tube, and immediately subjecting the thin unset single layer coating while the tube is in a vertical position and before the thin coating has had time to flow down the vertical tube to any considerable extent to the drying action of a drying current of air introduced into one end of the tube and discharging from the opposite end of the tube to accelerate the setting of the thin coating and thereby retard the tendency of the thin single layer coating to flow down the vertical tube.

THOMAS M. CORTESE.